(12) United States Patent
Adachi et al.

(10) Patent No.: US 6,761,945 B1
(45) Date of Patent: Jul. 13, 2004

(54) ELECTROLYTE TANK AND MANUFACTURING METHOD THEREOF

(75) Inventors: Toshihisa Adachi, Osaka (JP); Takefumi Itou, Osaka (JP); Toshihiko Takiguchi, Osaka (JP); Nobuyuki Tokuda, Osaka (JP)

(73) Assignees: Sumitomo Electric Industries, Ltd., Osaka (JP); Kansai Electric Power Co., Ltd., Osaka (JP)

( * ) Notice: Subject to any disclaimer, the term of this patent is extended or adjusted under 35 U.S.C. 154(b) by 0 days.

(21) Appl. No.: 09/418,315

(22) Filed: Oct. 14, 1999

(30) Foreign Application Priority Data

Apr. 28, 1999 (JP) .......................... 11-121454

(51) Int. Cl.[7] .................................................. B65G 5/00
(52) U.S. Cl. ................................... 428/36.1; 206/524.5
(58) Field of Search ....................... 428/36.1; 206/524.5

(56) References Cited

U.S. PATENT DOCUMENTS

| 3,534,796 A | 10/1970 | Knaus et al. | 206/524.5 |
|---|---|---|---|
| 4,086,393 A | 4/1978 | Hart | 429/51 |
| 5,996,799 A | * 12/1999 | Garreth et al. | 206/521 |

FOREIGN PATENT DOCUMENTS

| FR | 1505624 | * 12/1967 | |
|---|---|---|---|
| FR | 2432222 A | * 3/1980 | |
| JP | 54-60079 | 5/1979 | |
| JP | 60-31591 | 3/1985 | |
| JP | 62-229665 | 10/1987 | |
| JP | 3-1452 | 1/1991 | |
| JP | 5-35787 | 5/1993 | |
| JP | 9-239860 | 9/1997 | |
| JP | 10-34751 | 2/1998 | |
| JP | PAJ2001-043885 | * 7/1999 | H01M/8/18 |

OTHER PUBLICATIONS

Ullmann's Encyclopedia of Industrial Chemistry, 5th Edition, vol. A23, p. 376.*
European Search Report dated Sep. 9, 2000.

* cited by examiner

Primary Examiner—Sandra M. Nolan
(74) Attorney, Agent, or Firm—McDermott, Will & Emery

(57) ABSTRACT

An electrolyte tank which allows effective use of existing space of various shapes is provided. An electrolyte tank is formed by laminating one or more layers of coated fabric provided by coating a woven fabric of organic fiber with rubber or plastic and processing the laminated coated fabric to a bag-shape.

16 Claims, 3 Drawing Sheets

ELECTROLYTE TANK AND MANUFACTURING METHOD THEREOF

BACKGROUND OF THE INVENTION

1. Field of the Invention

The present invention generally relates to an electrolyte tank and, more specifically, to an electrolyte tank used for an electrolyte circulating type battery in which an electrolyte is caused to flow and circulate between electrodes for charging/discharging on the electrodes. The present invention further relates to a method of manufacturing such an electrolyte tank.

2. Description of the Background Art

Various new types of batteries have been developed as batteries for storing power to substitute for pumped storage power generation. Among such new types of batteries, a redox flow battery has been particularly attracting attention.

FIG. 8 is a schematic diagram of a redox flow battery as a representative example of the conventionally proposed electrolyte circulating type battery.

Referring to FIG. 8, a redox flow battery 1 includes a reaction cell 6, a positive electrolyte tank 2 and a negative electrolyte tank 3. Reaction cell 6 is partitioned by a diaphragm 4 formed of an ion exchange membrane or the like into two portions, one serving as a positive electrode cell 6a and the other serving as a negative electrode cell 6b.

Positive electrode cell 6a accommodates a positive electrode 7 and negative electrode cell 6b accommodates a negative electrode 8.

Positive electrode cell 6a and positive electrolyte tank 2 are coupled by a positive electrolyte feeding tube 9 feeding the positive electrolyte to positive electrode cell 6a, and a positive electrolyte recovering tube 10 recovering the positive electrolyte from positive electrode cell 6a to positive electrolyte tank 2.

In positive electrolyte feeding tube 9, a pump 11 as positive electrolyte feeding and circulating means is provided, so as to allow circulation of the positive electrolyte between positive electrode cell 6a and positive electrolyte tank 2.

Negative electrode cell 6a and negative electrolyte tank 3 are coupled by a negative electrolyte feeding tube 12 feeding the negative electrolyte from negative electrolyte tank 3 to negative electrode cell 6b and a negative electrolyte recovering tube recovering the negative electrolyte from negative electrode cell 6b to negative electrolyte tank 3.

Further, in negative electrolyte feeding tube 12, a pump 14 as negative electrolyte feeding and circulating means is provided, allowing circulation of the negative electrolyte between negative electrode cell 6b and negative electrolyte tank 3.

In positive electrolyte tank 2, positive electrolyte as reactive liquid is stored, and in negative electrolyte tank 3, negative electrolyte as reactive liquid is stored.

As the positive electrolyte, aqueous solution of ions such as Fe ions of variable valence is used, and as the negative electrolyte, aqueous solution of ions such as chromium ions with variable valence is used.

A hydrochloric acid aqueous solution containing positive active substance $Fe^{3+}/Fe^{2+}$ may be used as the positive electrolyte, and a hydrochloric acid aqueous solution containing negative active substance $Cr^{2+}/Cr^{3+}$ may be used as the negative electrolyte, for example.

In redox flow battery 1 using such electrolytes, at the time of charging, the hydrochloric acid aqueous solution containing $Cr^{3+}$ ions stored in negative electrolyte tank 3 is fed to negative electrode cell 6b by means of pump 14, electrons are received at negative electrode 8 so that ions are reduced to $Cr^{2+}$ ions, and recovered to negative electrolyte tank 3.

The hydrochloric acid aqueous solution containing $Fe^{2+}$ ions stored in positive electrolyte tank 2 is fed to positive electrode cell 6a by means of pump 11, electrons are emitted to an external circuitry at positive electrode 7, so that ions are oxidized to $Fe^{3+}$ ions, and recovered to positive electrolyte tank 2.

At the time of discharging, the hydrofluoric acid aqueous solution containing $Cr^{2+}$ ions stored in negative electrolyte tank 3 is fed to negative electrode cell 6b by means of pump 14, electrons are emitted to the external circuitry at negative electrode 8, so that ions are oxidized to $Cr^{3+}$ ions and recovered to negative electrolyte tank 3.

The hydrochloric acid aqueous solution containing $Fe^{3+}$ ions stored in positive electrolyte tank 2 is fed to positive electrode cell 6a by means of pump 11, electrons are received from the external circuitry so that ions are reduced to $Fe^{2+}$ ions, and recovered to positive electrolyte tank 2.

In such a redox flow battery, the charging/discharging reactions at positive electrode 7 and negative electrode 8 are as follows.

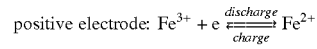

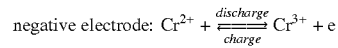

Electromotive force of about 1V can be obtained by the above described charging/discharging reactions.

In the conventional electrolyte circulating type battery having the above described structure, electrolyte tanks 2 and 3 are formed as a box-shaped or cylindrical shaped container of metal or FRP with a chemical resistant resin layer provided inside the container. Accordingly, installation requires considerable labor comparable to a general construction work. Further, it has been necessary to secure a place for installation. Further, reliability has been low because of leakage of the electrolyte at a connecting portion of the material. Further, when there is a stress distorted slightly, the battery is prone to cracks, resulting in leakage of the electrolyte. Further, it has been difficult to make use of existing space.

SUMMARY OF THE INVENTION

Therefore, an object of the present invention is to provide an electrolyte tank of which moving is easy.

Another object of the present invention is to provide an electrolyte tank which allows free use of existing space.

A still further object of the present invention is to provide an electrolyte tank of which installation is simple.

A still further object of the present invention is to provide an electrolyte tank having extremely high reliability at the connecting portion.

A still further object of the present invention is to provide an electrolyte tank free of any influence of a distortion to some extent.

A still further object of the present invention is to provide a method of manufacturing such an electrolyte tank.

The electrolyte tank in accordance with the present invention is formed as a bag-shaped flexible container in which membrane having one, or two or more laminated layers of coated fabric provided by coating woven fabric of organic fiber with rubber or plastic, is connected to a shape of the bag.

In the electrolyte tank in accordance with the present invention, even when the woven fabric is not very strong, it is unnecessary to separately prepare extra reinforcing member or the like, if the container is filled with the electrolyte so that the container is brought into tight contact with the whole space of a reservoir of a building for example, to generate load of internal pressure.

It may be effective to manufacture a tank of such a three-dimensional shape that confirms to the accommodating space in advance. Considering reliability at the connecting portion of the membrane, however, it may be preferable that the tank is manufactured as an envelope-like bag body, the tank is bent to a prescribed shape and thereafter the liquid is poured into the bag, to enable effective use of the space, as in the case where the tank is formed in a shape corresponding to the accommodating space. If the space is wide and open, the tank stands by itself if the woven fabric is adapted to have sufficient strength to withstand the internal pressure. Therefore, the tank may be installed at any place without special reinforcing member.

Further, it is possible to provide a manhole allowing passage of an operator, in the membrane of the electrolyte tank in accordance with the present invention. This allows human access during manufacturing of the bag-shaped body or for inspection of the internal surface when the tank fails.

In order to prevent as much as possible degradation of insulation from the manhole portion, it is preferable that the outer surface of the manhole portion is entirely covered by a rubber or plastic sheet or rubber or plastic coated fabric. At the time of emergency, the manhole can be used by tearing the cover on the outer surface, and after use, the torn cover may be removed from the connecting portion and a new cover may be re-applied.

In the electrolyte tank of the present invention, a metal, rubber or plastic film may be provided covering the outer side of the flexible bag-shaped container. This improves insulation, liquid leakage property and air permeability of the container than when not covered by such a film. Further, when a material having gas permeability coefficient of at most $1 \times 10^{-10}$ cc·cm/cm$^2$·sec·cmHg is selected as the rubber or plastic, air permeation into the tank can be suppressed with such a film thickness that rigidity of the film is sufficiently low, and therefore degradation of the electrolyte by oxidation can be prevented.

When a layer mainly consisting of water absorbing polymer is provided on a surface not in contact with the electrolyte of the flexible bag-shaped container, it is possible to stop leakage in a short period of time, even if the container should be damaged, causing leakage of the electrolyte.

As to the organic fiber of the woven fabric, any general fiber may be used. Considering the possibility that the electrolyte comes to be in contact with the organic fiber after long time of use, however, organic fiber formed of chemical resistant resin such as polyester, polyethylene, fluoroplastics or the like, which is not degraded by the component of the electrolyte, is desirable. In view of strength and cost, polyester is the most preferable material.

As the rubber mentioned above, natural rubber or synthetic rubber may be used. Use of a chemical resistant material such as chlorosulfonated polethylene, EPDM (ethylene-propylene-diene-methylene) rubber, butyl rubber or the like, which is strong against electrolyte, is desirable.

This suppresses permeation of the electrolyte, and hence provides an electrolyte tank which maintains insulation and durability over a long period.

A thermoplastic elastomer, which has been attracting attention recently as one type of rubber may be used as the flexible material. From the same reason as described above, it is preferable to select a chemical resistant material such as a polyorefin type material.

Even when the material of the rubber is not selective, it is desired that organic peroxide is used as the crosslinking agent of the rubber, than sulfur used as the crosslinking agent. Organic peroxide has the advantage of higher crosslink density, so that it suppresses the rate of permeation of the electrolyte and improves mechanical strength. Therefore, even when the material is the same, one crosslinked by the organic peroxide exhibits superior chemical resistance.

As the aforementioned plastics, any plastics generally available may be used. From the same reason as described with respect to rubber, a chemical resistant material such as vinyl chloride type or polyorefin type material is preferred.

As to the structure of the woven fabric, the fabric may have general structure such as plain weave or basket weave. When the rubber with which the woven fabric is to be coated is of a special material and it is difficult to establish adhesion with the woven fabric, for example, reliability at the interface of adhesion between the woven fabric and the rubber will be extremely low. Therefore, it is preferred that the woven fabric has open weave, so that the coating rubber on the front and back surfaces of the woven fabric is bridged and integrated.

As the woven fabric, any fabric having any strength may be used dependent on the condition of use. When the flexible bag-shaped container is to stand by itself, for example, the strength both in the warp and weft directions should be at least 400 kgf/in, taking into account the safety factor. Though it is possible to use a material having lower strength, durability is questionable when the container should stand safe by itself.

When the electrolyte tank of the present invention is formed as a rubber tank, it is possible, as in the conventional product formed of rubber coated fabrics, to joint the membrane to the shape of a bag in the unvulcanized state, and thereafter to vulcanize or crosslink the material by applying heat and pressure entirely. In order to nullify defect in the membrane, which may be the cause of lower insulation, however, it is desirable that the membrane is vulcanized and crosslinked before jointing work independently, and thereafter the vulcanized membrane is press-jointed. The press jointing may be performed using an adhesive, after physically roughening the surface of the vulcanized rubber as in the prior art. When the reliability of the jointing portion is considered, however, it is desired that press jointing is performed with unvulcanized rubber interposed. At this time, the unvulcanized rubber is vulvanized and integrated with the membrane.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
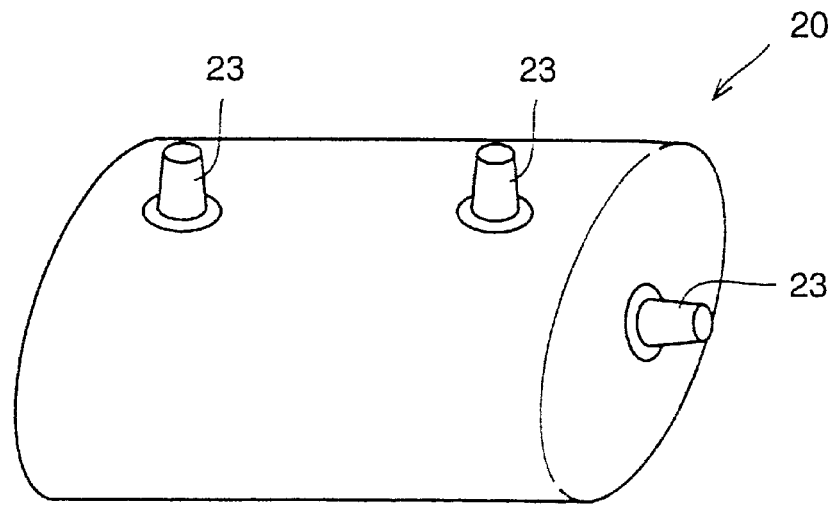
FIG. 1 is a perspective view of the electrolyte tank in accordance with a first embodiment of the present invention.
Figure 2:
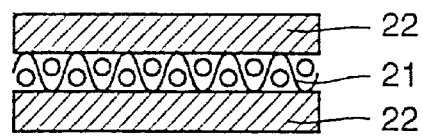
FIG. 2 is a cross sectional view of a membrane for the electrolyte tank in accordance with the first embodiment.

FIG. 1 is a perspective view of the electrolyte tank in accordance with the first embodiment. FIG. 2 is a cross sectional view of the membrane for the electrolyte tank.

Referring to these figures, an electrolyte tank 20 is formed by connecting, to the shape of a bag, a membrane having one or more laminated layers of coated fabric provided by coating woven fabric 21 of organic fiber with rubber or plastic 22, and the tank is thus a bag-shaped flexible container. On electrolyte tank 20, there are three flanges 23 attached, that is, an outlet and an inlet of the electrolyte, and an opening to be connected to a communicating tube connecting a positive electrolyte tank and a negative electrolyte tank.

Electrolyte tank 20 structured in this manner is a bag-shaped flexible container which can be made compact, facilitating moving. Further, as it has freedom to some extent in its shape, when the tank is made compact and put into a space and thereafter filled with liquid therein, the tank can be fixed in the space without any special work for installation, except connection of ducts and the like.

As described above, the electrolyte tank in accordance with the first embodiment allows free use of an existing space. For example, it can be installed in a reservoir of a building. Further, as the installation is simple, the necessary cost is low. Further, as the membranes are overlapped and integrated, reliability at the connecting portion is very high. Further, even when there is some distortion, the tank is not influenced, as the container is flexible.

Second Embodiment

Figure 3:
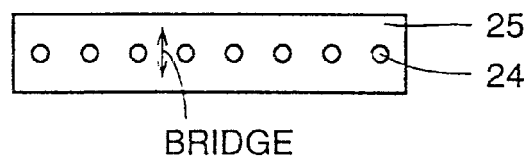
FIG. 3 is a cross sectional view of the membrane for the electrolyte tank in accordance with a second embodiment.

Referring to FIG. 3, a woven fabric 24 of open weave, formed of polyethylene is prepared. Rubber coated fabrics were prepared by coating the woven fabric with various rubber materials 25. Samples of electrolyte tank 20 were formed by connecting the coated fabrics to the shape of a bag as shown in FIG. 1. Each rubber coated fabric was adapted to have two-layered structure, with a layer containing water absorbing polymer provided on the outer side. Two samples each were fabricated for respective materials, and on each sample of electrolyte tank 20, three flanges 23 were provided, which were connected to the cells as electrolyte outlet, inlet and communicating tube connection opening, whereby samples of the redox flow battery were formed. Each sample of electrolyte tank 20 was put in a metal box of 1 m³ and filled with the electrolyte. Vanadium sulfate was used as the electrolyte. The battery was operated without any problem. The differences derived from different coating materials were as follows.

When butyl rubber or EPDM rubber was used as the rubber, degradation in strength after infiltration for one week in vanadium sulfate liquid at 70° C. was about one fifth that experienced by SBR or natural rubber. The result was similar when a thermoplastic elastomer of polyorefin type was used as the rubber.

The test as described above was conducted using EPDM to be cross-linked with peroxide and EPDM to be vulcanized as the rubber, and degradation in strength of the former was about one third of the latter.

A hole of φ2 was opened in the electrolyte tank. In a sample of the tank not provided with the water absorbing polymer layer, liquid leakage could not be stopped, while in a sample of the tank provided with the water absorbing polymer layer, liquid leakage could be stopped within 30 seconds.

Third Embodiment

A woven fabric of open weave formed of polyester was prepared, coated with vinyl chloride, and connected to a bag shape to form an electrolyte tank. As the woven fabric, one having strength of 400 kgf/in both in the warp and weft directions was used. The electrolyte tank was filled with the electrolyte to impose load of internal pressure of 0.3 kgf/in, so that the tank stands by itself. Further, a bag formed of polyethylene was put over the tank, and air between the electrolyte tank and the polyethylene bag was evacuated by a vacuum cleaner. Two samples of such electrolyte tank were fabricated and redox flow batteries were formed. Vanadium sulfate was used as the electrolyte. The system was operated, and the degree of oxidation of the electrolyte over one month was about one half that when the cover was not put.

Fourth Embodiment

As described with respect to the first embodiment, though it is effective to manufacture the electrolyte tank in such a shape that confirms to the accommodating space in advance, the electrolyte tank in accordance with the fourth embodiment is more effective, considering reliability of the connecting portion of the membrane.

Figure 4:
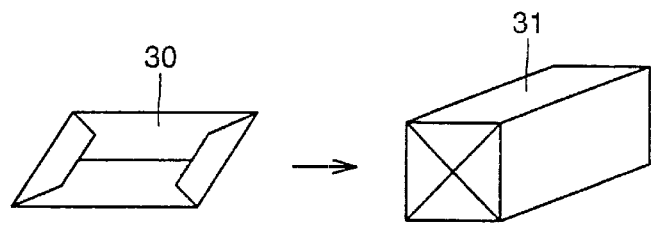
FIG. 4 is an illustration representing a method of manufacturing an electrolyte tank in accordance with a fourth embodiment.

Referring to FIG. 4, first, a tank 30 was manufactured as an envelope-like bag body, the bag body is bent to a prescribed shape, liquid is introduced thereto, and thus an electrolyte tank 31 is completed. In this manner, it is possible to effectively use a space, as in the case when the tank is formed to be confirming to the accommodating space.

Fifth Embodiment

Figure 5:
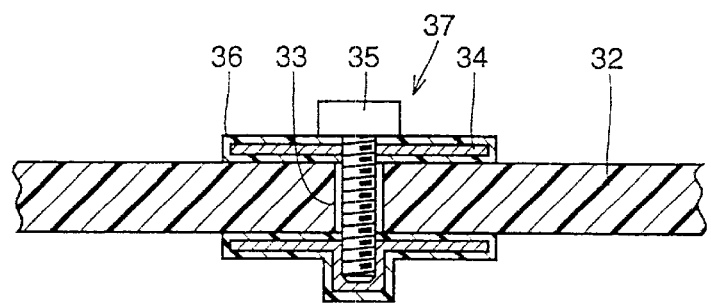
FIG. 5 is a cross sectional view of the membrane of the electrolyte tank in accordance with a fifth embodiment.

FIG. 5 is a cross sectional view of the membrane of the electrolyte tank in accordance with the fifth embodiment.

Figure 6:
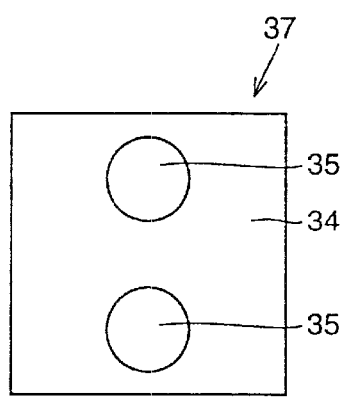
FIG. 6 is a plan view of a manhole portion of the electrolyte tank in accordance with the fifth embodiment.

Referring to FIG. 5, a manhole 37 allowing passage of a person is provided in a membrane 32 for the electrolyte tank in accordance with the fifth embodiment. FIG. 6 is a plan view of the manhole portion. Referring to these figures, manhole 37 includes a hole 33 formed in the membrane 32, metal plates 34, 34 coated with rubber or plastic, provided on outer and inner surfaces of membrane 32, and a bolt 35 fixing metal plate 34, 34. This structure allows opening of manhole 37 and passage of an operator to perform inspection of the internal surface, for example, when the electrolyte tank is manufactured as a bag or when there is an accident in the tank.

Figure 7:
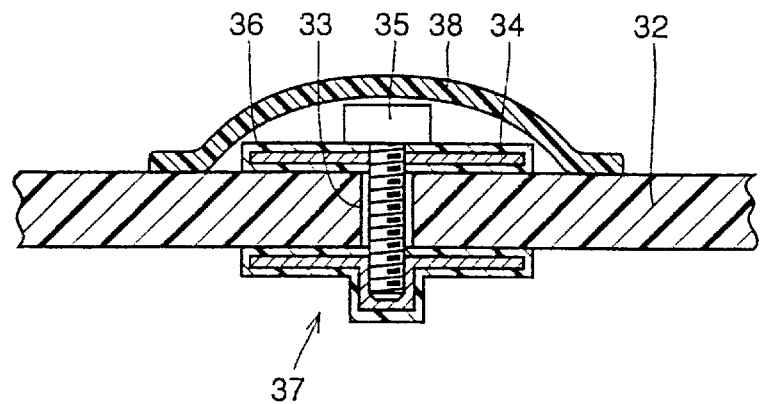
FIG. 7 is a cross sectional view of the membrane showing a more preferably example of the electrolyte tank in accordance with the fifth embodiment.
Figure 8:
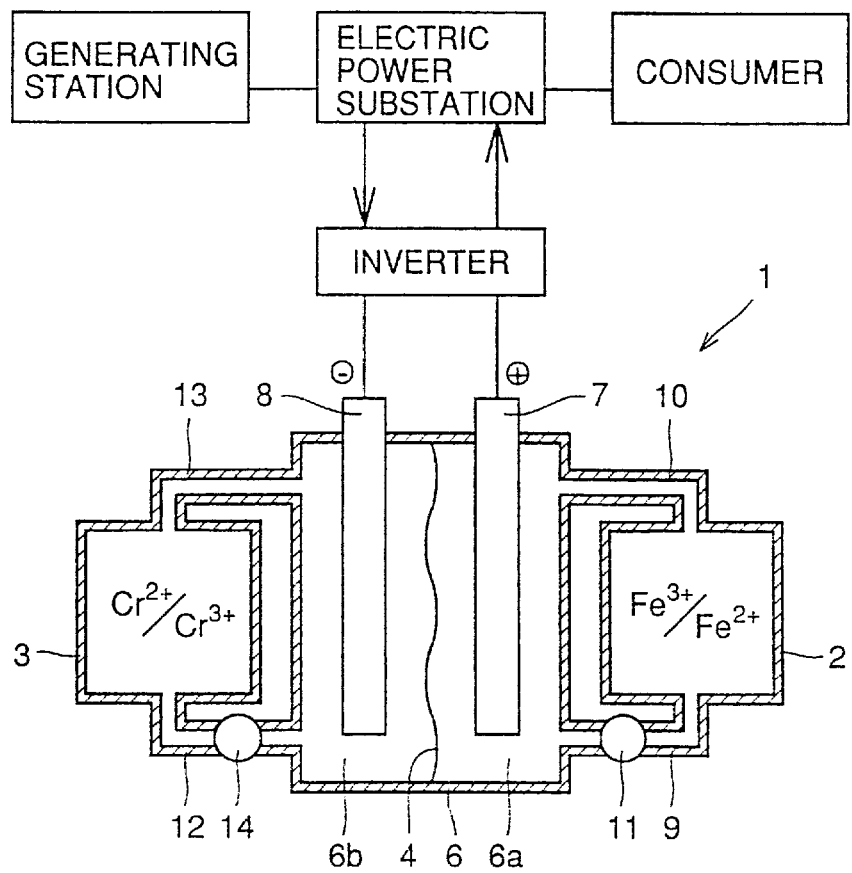
FIG. 8 is a schematic illustration of a conventional redox flow battery.

Referring to FIG. 7, in order to minimize degradation of insulation through manhole 37, it is preferred that the entire outer surface of manhole 37 is covered by a rubber or plastic sheet 38 or a fabric coated with rubber or plastic.

At the time of an emergency, by tearing the rubber or plastic sheet 38 on the outer surface, the manhole can be used and after use, the torn sheet 38 may be removed from the connecting portion, and a new sheet 38 may be re-applied.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electrolyte tank installable in an accommodating space, for storing an electrolyte which is caused to flow and circulate to an electrode, characterized in that the tank is formed by preparing a coated fabric by coating a woven fabric of organic fiber with rubber or plastic, forming a membrane by laminating one or more layers of the coated fabric, processing the membrane into a shape of a bag in a compact state and that when the bag in said compact state is put in said accommodating space and filled with the electrolyte, and inflating the bag to fully occupy said accommodating space to form said tank that stands by itself without need of any reinforcing member.

2. The electrolyte tank according to claim 1, having manhole allowing passage of a person into and out from the tank, provided at a portion of said membrane.

3. The electrolyte tank according to claim 2, wherein said manhole has an outer surface of said manhole, said outer surface is covered by a rubber or plastic sheet or by a coated fabric provided by coating woven fabric of organic fiber with rubber or plastic.

4. An electrolyte tank according to claim 1, wherein said tank has an outer side which is coated with at least one layer of a film formed of metal, rubber or plastic.

5. The electrolyte tank according to claim 4, wherein said rubber or plastic has gas permeability coefficient of at most $1 \times 10^{-10}$ cc·cm/cm2·sec·cmHg.

6. The electrolyte tank according to claim 1, wherein a resin layer mainly consisting of a water absorbing polymer is provided on a surface not in contact with the electrolyte of said electrolyte tank.

7. The electrolyte tank according to claim 1, wherein said material of said organic fiber is polyester or polyethylene.

8. The electrolyte tank according to claim 1, wherein material of said rubber is butyl rubber, chlorosulfonated polyethylene or EPDM.

9. The electrolyte tank according to claim 1, wherein said rubber is a polyolefin thermoplastic elastomer.

10. The electrolyte tank according to claim 1, wherein said rubber is crosslinked rubber using organic peroxide as a crosslinking agent.

11. The electrolyte tank according to claim 1, wherein said plastic is a polyvinyl chloride or a polyolefin.

12. The electrolyte tank according to claim 1, wherein said woven fabric has open weave structure.

13. The electrolyte tank according to claim 1, wherein said woven fabric has strength of at least 400 kgf/in both in warp and weft directions.

14. A method of manufacturing an electrolyte tank, comprising the steps of preparing a coated fabric by coating woven fabric of organic fiber with rubber, preparing a membrane by laminating one or more layers of the coated fabric, vulcanizing or crosslinking the membrane using pressure and heat to provide vulcanized membrane, press jointing the vulcanized membrane to form a bag-shape container, and making the bag-shaped container compact.

15. The method of manufacturing an electrolyte tank according to claim 14, wherein said vulcanized membrane is processed to a bag-shape by press-jointing with unvulcanized rubber interposed.

16. An inflatable electrolyte tank in the shape of a bag, the tank being installable in an accommodating space, for storing an electrolyte which is caused to flow and circulate to an electrode, wherein the bag is formed by preparing a coated fabric by coating a woven fabric of organic fiber with rubber or plastic, forming a membrane by laminating one or more layers of the coated fabric, and processing the membrane into a shape of a bag in a compact state such that when the bag in said compact state is put in said accommodating space and filled with the electrolyte, the bag will inflate to fully occupy said accommodating space and by itself without the need of any reinforcing member.

\* \* \* \* \*

UNITED STATES PATENT AND TRADEMARK OFFICE
CERTIFICATE OF CORRECTION

PATENT NO. : 6,761,945 B1
DATED : July 13, 2004
INVENTOR(S) : Toshihisa Adachi et al.

It is certified that error appears in the above-identified patent and that said Letters Patent is hereby corrected as shown below:

Title page,
Item [73], Assignees, change "Kansai Electric Power Co., Ltd., Osaka (JP)" to
-- Kansai Electric Power Co., Inc., Osaka (JP) --

Signed and Sealed this

Seventh Day of June, 2005

JON W. DUDAS
*Director of the United States Patent and Trademark Office*